(12) United States Patent
Yamanaka et al.

(10) Patent No.: US 7,169,837 B2
(45) Date of Patent: *Jan. 30, 2007

(54) FLAME-RESISTANT RESIN COMPOSITION AND ARTICLE MOLDED THEREFROM

(75) Inventors: Katsuhiro Yamanaka, Tokyo (JP); Kazuhiko Koya, Tokyo (JP); Yutaka Taketani, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 363 days.

This patent is subject to a terminal disclaimer.

(21) Appl. No.: 10/736,682

(22) Filed: Dec. 17, 2003

(65) Prior Publication Data

US 2004/0132876 A1  Jul. 8, 2004

Related U.S. Application Data

(63) Continuation of application No. 10/182,773, filed as application No. PCT/JP00/04850 on Jul. 19, 2000, now abandoned.

(30) Foreign Application Priority Data

Feb. 4, 2000  (JP) ............... 2000-027689

(51) Int. Cl.
C08K 3/02 (2006.01)
C08K 5/5357 (2006.01)

(52) U.S. Cl. ................ 524/117; 524/120
(58) Field of Classification Search ............. None
See application file for complete search history.

(56) References Cited

U.S. PATENT DOCUMENTS

| 4,154,775 A | 5/1979 | Axelrod |
| 4,162,278 A | 7/1979 | Granzow |
| 4,178,281 A | 12/1979 | Horn, Jr. |
| 4,520,152 A | 5/1985 | Axelrod |
| 6,124,385 A | 9/2000 | Honl et al. |
| 6,194,496 B1 | 2/2001 | Weber et al. |
| 6,451,889 B1 | 9/2002 | Jang et al. |

FOREIGN PATENT DOCUMENTS

| DE | 19648799 | 5/1998 |
| EP | 0 372 321 A | 6/1990 |
| JP | 54-157156 | 12/1979 |
| JP | 60-079048 | 5/1985 |
| JP | 61009450 A * | 1/1986 |
| JP | 61-103958 | 5/1986 |
| JP | 4-117442 | 4/1992 |
| JP | 5-092986 | 4/1993 |
| JP | 5-295249 | 11/1993 |
| JP | 6-179823 | 6/1994 |
| JP | 8-120152 | 5/1996 |
| JP | 8-176396 | 7/1996 |
| JP | 8-311278 | 11/1996 |
| JP | 9-241422 | 9/1997 |
| JP | 11-256022 | 9/1999 |

OTHER PUBLICATIONS

USPTO obtained translation of JP 61-9450A.*
Derwent machine-assisted translation of JP 9-241422A.*
JPO machined translation of JP 8-176396A.*
USPTO obtained translation of JP 60-79048A.*
Derwent machine-assisted translation of JP 6-179823A.*
Derwent machine-assisted translation of JP 5-295249A.*
Derwent machine-assisted translation of JP 11-256022A.*
PAJ abstract of JP61-009450 (Jan. 17, 1986), Tsunetani et al., "Flame Retardant Resin Composition".

* cited by examiner

Primary Examiner—Matthew A. Thexton
(74) Attorney, Agent, or Firm—Wenderoth, Lind & Ponack, L.L.P.

(57) ABSTRACT

A flame retardant resin composition comprising:
(A) 100 parts by weight of a resin component (component a) containing at least 50% by weight of a high impact polystyrene, and
(B) 1 to 50 parts by weight of a phosphorous-containing compound (component b) represented by the following general formula (I):

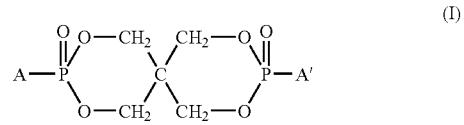

wherein A and A' are the same or different and represent —OR or -Q wherein R and Q represent an alkyl group having 1 to 12 carbon atoms, a cycloalkyl group having 5 to 10 carbon atoms, an aralkyl group having 7 to 20 carbon atoms or an aryl group having 6 to 15 carbon atoms. According to the present invention, there are provided a polystyrene resin composition containing substantially no halogen and having heat resistance, particularly a high heat distortion temperature under load, and an article from the composition.

5 Claims, No Drawings

FLAME-RESISTANT RESIN COMPOSITION AND ARTICLE MOLDED THEREFROM

CROSS REFERENCE TO RELATED APPLICATIONS

This is a continuation of Ser. No. 10/182,773, filed Aug. 1, 2002, now abandoned which is a 371 of PCT/JP00/04850, filed Jul. 19, 2000 now published as WO 2001/57134 A1 Aug. 9, 2001.

BACKGROUND OF THE INVENTION (1) Field of the Invention

The present invention relates to a flame-retarded polystyrene resin composition. More specifically, the present invention relates to a flame-retarded polystyrene resin composition having excellent heat resistance and good impact resistance and an article molded therefrom. Further, the present invention also relates to a flame-retarded polystyrene resin composition having a high heat distortion temperature under load and containing substantially no halogen and an article molded therefrom.

(2) Description of Related Art

A polystyrene resin is used in a wide variety of fields such as components of office automation equipment, home electric appliances and automobiles due to excellent impact resistance and moldability. However, its use is limited due to its flammability. As a method for making the polystyrene resin flame-retardant, addition of a halogen compound, a phosphorus compound or an inorganic compound as a flame retardant is known, so that a certain degree of flame retardancy is achieved by the addition. However, to increase the degree of safety of products, regulations on molded articles in office automation equipment and home electric appliances by a flame retardancy test based on SUBJECT 94 of Underwriters Laboratories (UL) Inc. which is a standard in U.S. have been becoming increasingly strict year by year, and a higher degree of flame-retardancy is desired.

Heretofore, as methods for improving flame retardancy of the polystyrene resin, a resin composition (Japanese Patent Laid-Open Publication No. 4-117442) comprising a polystyrene resin, a nitrogen compound such as melamine, a polyol and an organic phosphate and an ignition melt-dripping self-extinguishable polystyrene resin composition (Japanese Patent Publication No. 6-43542) comprising a rubber-modified polystyrene resin and a halogen compound are known, for example. However, these resin compositions have a problem that their applications are limited due to unsatisfactory flame retardancy.

In addition, in recent years, it has been reported that a halogen compound has an adverse effect on the environment, and a movement of use of halogen-free resin molded articles is thereby expanded from Europe. For this reason, demand for a halogen-free flame retardant has also been increased, and vigorous developments of halogen-free flame retardants for a variety of resins have been started. However, with respect to making the polystyrene resin flame-retardant without use of halogen, it has heretofore been believed to be difficult to achieve it due to flammability of the polystyrene resin.

As a known prior art in the field, a resin composition comprising a specific rubber-modified polystyrene resin and a phosphorus-containing flame retardant is disclosed in Japanese Patent Laid-Open Publication Nos. 8-176396 and 8-120152. To be more specific, it is disclosed that flame retardancy of melt-dripping self-extinguishing type is exhibited by use of triphenyl phosphate and derivative thereof or red phosphorus as the phosphorus-containing flame retardant. However, a composition using triphenyl phosphate and derivative thereof is caused to exhibit flame retardancy as a result of increasing flowability by a plasticizing effect so as to facilitate melt-dripping at the time of ignition. The resin composition has significantly low heat resistance and has a problem that it is of little practical use. In the case of a composition using red phosphorus, it needs to contain a relatively large amount of red phosphorus so as to exhibit flame retardancy. For this reason, a toxic phosphine gas is liable to be produced at the time of extrusion of the resin composition. Further, the resin composition also has such problems that red phosphorus is difficult to handle and that the obtained resin composition becomes brown inherent in red phosphorus, thereby limiting applications of the resin composition.

Further, Japanese Patent Laid-Open Publication No. 8-311278 discloses a melt-dripping self-extinguishing flame-retardant resin composition comprising a rubber-modified polystyrene resin, an organic phosphorus compound monomer, an organic phosphorus compound condensate and a silicone oil and containing 50 to 100% by weight of the above monomer in the organic phosphorus compound. More specifically, a rubber-modified polystyrene having a reduced viscosity of 0.53 dl/g is used, and the resin composition also has poor heat resistance and impact resistance and therefore has a problem that it is of little practical use.

Thus, in the conventional rubber-modified polystyrene resin compositions, a certain degree of flame retardancy is achieved, but they also have poor heat resistance. Particularly, it is difficult to apply them to applications requiring high heat resistance such as a housing of office automation equipment, and improvements in the resin compositions are desired.

PROBLEMS TO BE SOLVED BY THE INVENTION

A first object of the present invention is to provide a polystyrene resin composition which can achieve flame retardancy of ignition melt-dripping type, that is, flame retardancy of at least a level V2 in an UL94 Standard, and has excellent heat resistance.

A second object of the present invention to provide a flame-retardant rubber-modified polystyrene resin composition which maintains a high level of impact resistance and undergoes a little drop in a heat distortion temperature under load.

A third object of the present invention is to provide a rubber-modified polystyrene resin composition having high levels of well-balanced heat distortion temperature under load, impact resistance and flame retardancy and containing substantially no halogen.

Another object of the present invention is to provide a flame-retardant rubber-modified polystyrene resin composition which can be advantageously used in a housing of office automation equipment, a container and the like.

BRIEF SUMMARY OF THE INVENTION

According to studies made by the present inventors, the above objects of the present invention are achieved by a flame retardant resin composition comprising:
(A) 100 parts by weight of a resin component (component a) containing at least 50% by weight of a high impact polystyrene, and (B) 1 to 50 parts by weight of a phosphorus-containing compound (component b) represented by the following general formula (I):

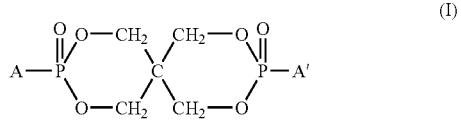

wherein A and A' are the same or different and represent —OR or -Q wherein R and Q represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

DETAILED DESCRIPTION OF THE INVENTION

It is known that some of the phosphorus-containing compounds (component b) represented by the above general formula (I) are used as a flame retardant. Japanese Patent Laid-Open Publication No. 54-157156 discloses use of a diphosphonate having spiro rings as typified by dimethylpentaerythritol diphosphonate, dimethylpentaerythritol diphosphate and diphenylpentaerythritol diphosphonate as a flame retardant for a polycarbonate resin. The invention disclosed in the publication simply teaches that the degree of flame retardancy of the polycarbonate resin increases by addition of the diphosphonate.

Further, an aromatic polycarbonate resin composition containing pentaerythritol diphosphate or pentaerythritol diphosphonate as a flame retardant is described in a specification of U.S. Pat. No. 4,178,281. This U.S. Patent describes making an aromatic polycarbonate resin or a mixture of the aromatic polycarbonate resin and an ABS resin flame-retardant and contains no descriptions about resins other than the above resins.

A flame-retardant resin composition obtained by mixing pentaerythritol diphosphonate into a specific resin mixture comprising a polyphenylene ether and a high impact polystyrene is described in a specification of U.S. Pat. No. 4,162,278. The U.S. Patent simply teaches that flame retardancy which satisfies a V-0 or V-1 standard has been achieved for the above specific resin mixture and contains no specific composition ratios in Examples.

In addition, a resin composition containing di-substituted phenyl pentaerythritol diphosphate as a flame retardant is described in Japanese Patent Laid-Open Publication No. 5-92986. A di-substituted phenyl group of the diphosphate is a di-substituted phenyl group having a steric hindrance group such as a methyl group or a t-butyl group at positions 2 and 6 as a substituent. It is disclosed that the di-substituted phenyl pentaerythritol diphosphate having the specific structure has excellent thermal stability against a resin as compared with a diphosphate having no substituents. In this publication, target resins are not particularly limited, and an extremely wide variety of resins are presented. However, specific resins with which the effect of the di-substituted phenyl pentaerythritol diphosphate has been confirmed are a resin composed essentially of a polyphenylene ether and a polycarbonate resin.

According to the present invention, it has been found that mixing of a phosphorus-containing compound having a specific structure having spiro rings including the diphosphonates or the diphosphates into a high impact polystyrene resin not only improves flame retardancy but also surprisingly reduces degradation in heat resistance, particularly a drop in a heat distortion temperature under load.

As is obvious from Examples and Comparative Examples to be described later, it has been found that under preferred mixing conditions of the present invention, mixing of the phosphorus-containing compound into the high impact polystyrene resin causes substantially no drop in a heat distortion temperature under load of the high impact polystyrene resin itself or may cause even a slight increase in the heat distortion temperature under load in some cases. The phenomenon that degradation in heat resistance is little is thought to be peculiar behavior caused by a combination of the phosphorus-containing compound and the high impact polystyrene resin in the present invention.

When a commonly well-known flame retardant such as triphenyl phosphate (TPP) or bis(nonylphenyl)phenyl phosphate (BNPP) is used as a flame retardant for the high impact polystyrene resin, a significant drop in the heat distortion temperature under load is inevitable. This fact also makes it understandable that a combination of the resin and the phosphorus-containing compound in the resin composition of the present invention produces a peculiar effect. A fact that heat resistance typified by the heat distortion temperature under load of the high impact polystyrene is maintained at a high level despite having been flame-retarded increases its value of use and expands its fields of application. In addition, the resin composition of the present invention undergoes little degradation in impact resistance, thereby indicating that an advantage inherent in the high impact polystyrene resin is retained.

Heretofore, the resin composition of the present invention will be described in more detail.

A high impact polystyrene resin as the component a in the resin composition of the present invention is a polystyrene resin with improved impact resistance which is generally referred to as "HIPS". Generally, HIPS refers to a rubber-modified polystyrene resin.

The rubber-modified styrene resin refers to a polymer having a rubber-like polymer dispersed in granular form in a matrix composed essentially of an aromatic vinyl polymer and is obtained by subjecting a monomer mixture containing an aromatic vinyl monomer as an essential component to known mass polymerization, mass suspension polymerization, solution polymerization or emulsion polymerization in the presence of the rubber-like polymer.

Illustrative examples of the rubber-like polymer include diene-type rubber such as a polybutadiene and a poly(styrene-butadiene), saturated rubber obtained by hydrogenating the diene-type rubber, isoprene rubber, chloroprene rubber, acrylic rubber such as butyl polyacrylate and an ethylene-propylene-diene monomer terpolymer (EPDM). The diene-type rubber is particularly preferred.

Illustrative examples of the aromatic vinyl monomer which is an essential component in the graft copolymerizable monomer mixture to be polymerized in the presence of the above rubber-like polymer include styrene, α-methylstyrene and paramethylstyrene. Styrene is the most preferable.

The content of the rubber-like polymer component in the above rubber-modified polystyrene resin is 1 to 15% by weight, preferably 1 to 10% by weight, more preferably 2 to 8.5% by weight, and the content of the aromatic vinyl polymer component is 99 to 85% by weight, preferably 99 to 90% by weight, more preferably 98 to 91.5% by weight.

Within the above ranges, a balance among heat resistance, impact resistance and rigidity of a resin composition to be obtained improves and, further, the resin composition has a small number of unsaturated bonds, so that it is not easily oxidized and has excellent thermal stability advantageously.

A reduced viscosity $\eta_{SP}/C$ (determined by measuring 0.5 g/dl of a toluene solution at 30° C.) which is a scale for a molecular weight of the rubber-modified polystyrene resin in the present invention is 0.2 to 1.5 dl/g, preferably 0.4 to 1.3 dl/g, more preferably 0.6 to 1.1 dl/g. Illustrative examples of means for satisfying the above conditions with respect to the reduced viscosity $\eta_{SP}/C$ of the rubber-modified polystyrene resin include controls of a polymerization initiator, a polymerization temperature and a chain transfer agent. When the reduced viscosity is low, a resin composition having poor heat resistance and impact resistance is obtained.

In the flame retardant resin composition of the present invention, the resin component (component a) contains the above high impact polystyrene (component a-1) in an amount of 50 to 100% by weight, preferably 60 to 100% by weight, particularly preferably 70 to 100% by weight, based on 100% by weight of the resin component. A resin (component a-2) other than the high impact polystyrene in the resin component is at least one resin selected from the group consisting of a polyphenylene ether, a polycarbonate, an ABS resin, a polyester and a phenol resin. As the component a-2, the polyphenylene ether, polycarbonate or phenol resin is suitable. The component a-2 is used in an amount of 0 to 50% by weight, preferably 0 to 40% by weight, particularly preferably 0 to 30% by weight, based on 100% by weight of the resin component (component a).

The phosphorus-containing compound (component b) as a flame retardant in the flame retardant resin composition of the present invention is represented by the following general formula (I):

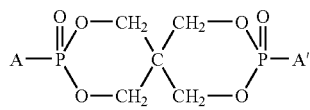
(I)

wherein A and A' are the same or different and represent —OR or -Q wherein R and Q represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

Alkyl groups represented by R and Q in the above general formula (I) have 1 to 12 carbon atoms, preferably 1 to 9 carbon atoms. Specific examples thereof include methyl, ethyl, propyl, isopropyl, n-butyl, sec-butyl, t-butyl, neopentyl and nonyl. Cycloalkyl groups represented by R and Q have 5 to 10 carbon atoms, preferably 6 to 8 carbon atoms. Specific examples thereof include cyclohexyl and cyclooctyl. Aralkyl groups represented by R and Q have 7 to 20 carbon atoms, preferably 7 to 11 carbon atoms. Specific examples thereof include benzyl, phenethyl, phenylpropyl, naphthylmethyl and 2-phenylisopropyl. Further, aryl groups represented by R and Q have 6 to 15 carbon atoms, preferably 6 to 10 carbon atoms. Specific examples thereof include phenyl, naphthyl, anthranyl, xylyl, trimethylphenyl, di-t-butylphenyl, di-t-butyl-methylphenyl and tri-t-butylphenyl.

The phosphorus-containing compounds represented by the above general formula (I) are classified into those represented by the following formulae (I-1), (I-2) and (I-3) based on differences in their chemical structures, and their flame retarding effects and effects on physical properties are slightly different. Hereinafter, the formulae (I-1), (I-2) and (I-3) will be described.

(1) Phosphorus-Containing Compound Represented by the Formula (I-1) (Component b-1)

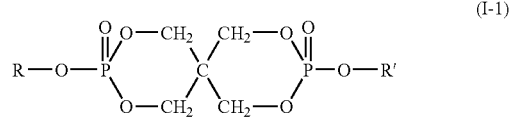
(I-1)

wherein R and R' are the same or different and represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

(2) Phosphorus-Containing Compound Represented by the Formula (I-2) (Component b-2)

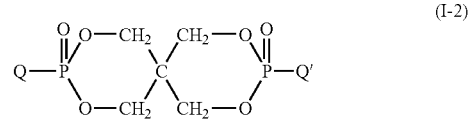
(I-2)

wherein Q and Q' are the same or different and represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

(3) Phosphorus-Containing Compound Represented by the Formula (I-3) (Component b-3)

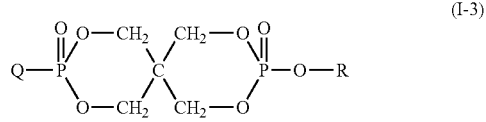
(I-3)

wherein Q and R are the same or different and represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

With respect to the definitions of R, $R^1$, Q and $Q^1$ in the above formulae (I-1) to (I-3), preferable examples and specific examples of the alkyl group having 1 to 12 carbon atoms, cycloalkyl group having 5 to 10 carbon atoms, aralkyl group having 7 to 20 carbon atoms and aryl group having 6 to 15 carbon atoms are the same as those set forth with respect to the above formula (I). Therefore, preferable examples and specific examples of the groups represented by R, $R^1$, Q and $Q^1$ in the formulae (I-1) to (I-3) will not be given.

Of the above formulae (I-1) to (I-3), the phosphorus-containing compound represented by the formula (I-2) has a particularly excellent effect as the resin composition of the present invention. Particularly, a phosphorus-containing compound represented by the formula (I-2) wherein Q and Q' are the same or different and represent a branched alkyl group having 3 to 5 carbon atoms such as isopropyl, sec-butyl, t-butyl, neopentyl or isopentyl, a cyclohexyl group, an α-methylbenzyl group or a 2-phenylisopropyl group has remarkable flame retardancy and is particularly preferred. The most preferred Q and Q' are isopropyl, sec-butyl, t-butyl, α-methylbenzyl and 2-phenylisopropyl. That is, a resin composition containing the phosphorus-containing compound represented by the formula (I-2) as the component b obtains an excellent flame retarding effect and provides a molded article having heat resistance, particularly a heat distortion temperature under load, maintained at a high level.

Next, specific phosphorus-containing compounds belonging to the formulae (I-1) to (I-3) will be set forth.

| (1) Compounds Belonging to the Formula (I-1) | | |
|---|---|---|
| Compound No. | —OR | —OR' |
| 1-a | phenoxy group | phenoxy group |
| 1-b | methoxy group | methoxy group |
| 1-c | ethoxy group | ethoxy group |
| 1-d | 2-methylphenoxy group | 2-methylphenoxy group |
| 1-e | 2,6-dimethylphenoxy group | 2,6-dimethylphenoxy group |
| 1-d | 2,6-di-t-butylphenoxy group | 2,6-di-t-butylphenoxy group |
| 1-f | cumylphenoxy group | cumylphenoxy group |
| 1-g | 4-nonylphenoxy group | 4-nonylphenoxy group |
| 1-h | α-naphthoxy group | α-naphthoxy group |
| 1-i | phenoxy group | methoxy group |
| 1-j | phenoxy group | ethoxy group |
| 1-k | cyclohexyl group | cyclohexyl group |

| (2) Compounds Belonging to the Formula (I-2) | | |
|---|---|---|
| Compound No. | -Q | -Q' |
| 2-a | methyl group | methyl group |
| 2-b | t-butyl group | t-butyl group |
| 2-c | benzyl group | benzyl group |
| 2-d | n-butyl group | n-butyl group |
| 2-e | sec-butyl group | sec-butyl group |
| 2-f | α-methylbenzyl group | α-methylbenzyl group |
| 2-g | 2-phenylisopropyl group | 2-phenylisopropyl group |
| 2-h | 2,6-dimethylbenzyl group | 2,6-dimethylbenzyl group |
| 2-i | 2,6-di-t-butylbenzyl group | 2,6-di-t-butylbenzyl group |
| 2-j | phenethyl group | phenethyl group |
| 2-k | phenyl group | phenyl group |
| 2-l | t-butyl group | methyl group |
| 2-m | t-butyl group | benzyl group |
| 2-n | t-butyl group | sec-butyl group |
| 2-o | methyl group | benzyl group |
| 2-p | cyclohexyl group | cyclohexyl group |

| (3) Compounds Belonging to the Formula (I-3) | | |
|---|---|---|
| Compound No. | —OR | -Q |
| 3-a | phenoxy group | methyl group |
| 3-b | phenoxy group | t-butyl group |
| 3-c | phenoxy group | benzyl group |
| 3-d | methoxy group | methyl group |
| 3-e | methoxy group | t-butyl group |
| 3-f | methoxy group | benzyl group |
| 3-g | 2,6-dimethylphenoxy group | methyl group |
| 3-h | 2,6-dimethylphenoxy group | t-butyl group |
| 3-i | 2,6-dimethylphenoxy group | benzyl group |
| 3-j | 2,6-di-t-butylphenoxy group | methyl group |
| 3-k | 2,6-di-t-butylphenoxy group | t-butyl group |
| 3-l | 2,6-di-t-butylphenoxy group | benzyl group |
| 3-m | phenoxy group | cyclohexyl group |

The resin composition of the present invention substantially comprises the resin component (component a) composed essentially of a high impact polystyrene and the phosphorus-containing compound represented by the above formula (I). Further, the resin composition may also contain another type of phosphorus or phosphorus compound as a component c. Addition of the component c can not only improve a flame retarding effect, physical strength, heat resistance or the like of the resin composition but also reduce costs.

Illustrative examples of components c that can be added include phosphorus and phosphorus compounds of the following (c-1) to (c-5).

(c-1) red phosphorus (c-2) triaryl phosphate represented by the following formula (c-2)

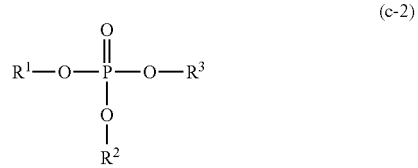

(c-3) condensed phosphate represented by the following formula (c-3)

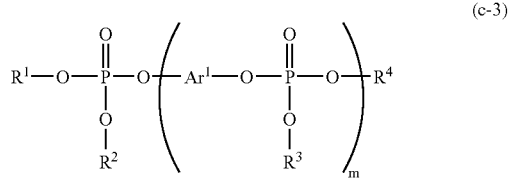

(c-4) condensed phosphate represented by the following formula (c-4)

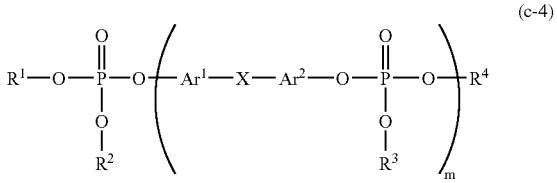

(c-5) compound represented by the following formula (c-5)

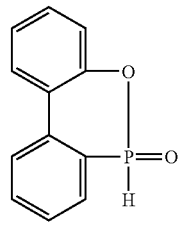

(c-5)

In the above formulae (c-2) to (c-4), $R^1$ to $R^4$ are the same or different and are an aryl group having 6 to 15 carbon atoms, preferably an aryl group having 6 to 10 carbon atoms. Specific examples of the aryl group include phenyl, naphthyl and anthryl. These aryl groups may have 1 to 5 substituents, preferably 1 to 3 substituents. Illustrative examples of such substituents include (i) alkyl groups having 1 to 12 carbon atoms (preferably alkyl groups having 1 to 8 carbon atoms) such as methyl, ethyl, propyl, isopropyl, n-butyl, sec-butyl, t-butyl, neopentyl and nonyl, (ii) alkyloxy groups having 1 to 12 carbon atoms (preferably alkyloxy groups having 1 to 8 carbon atoms) such as methoxy, ethoxy, propoxy, butoxy and pentoxy, (iii) alkylthio groups having 1 to 12 carbon atoms (preferably alkylthio groups having 1 to 8 carbon atoms) such as methylthio, ethylthio, propylthio, butylthio and pentylthio, and (iv) and a group represented by a formula —Y—$Ar^3$ (wherein Y represents —O—, —S— or an alkylene group having 1 to 8 carbon atoms, preferably 1 to 4 carbon atoms, and $Ar^3$ represents an aryl group having 6 to 15 carbon atoms, preferably 6 to 10 carbon atoms).

In the formulae (c-3) and (c-4), $Ar^1$ and $Ar^2$, if both are present (in the case of c-4), are the same or different and represent an arylene group having 6 to 15 carbon atoms, preferably an arylene group having 6 to 10 carbon atoms. Specific examples thereof include a phenylene group or a naphthylene group. Arylene groups represented by $Ar^1$ and $Ar^2$ may have 1 to 4 substituents, preferably 1 to 3 substituents. Illustrative examples of such substituents include (i) alkyl groups having 1 to 4 carbon atoms such as methyl, ethyl, propyl, isopropyl, n-butyl, sec-butyl and t-butyl, (ii) aralkyl groups having 7 to 20 carbon atoms such as benzyl, phenethyl, phenylpropyl, naphthylmethyl and cumyl, (iii) a group represented by a formula -Z-$R^5$ (wherein Z represents —O— or —S—, and $R^5$ represents an alkyl group having 1 to 4 carbon atoms, preferably 1 to 3 carbon atoms or an aryl group having 6 to 15 carbon atoms, preferably 6 to 10 carbon atoms), and (iv) aryl groups having 6 to 15 carbon atoms such as a phenyl group.

In the formulae (c-3) and (c-4), m represents an integer of 1 to 5, preferably an integer of 1 to 3, particularly preferably 1.

In the formula (c-4), X is a single bond or group which bonds $Ar^1$ and $Ar^2$ to each other, and —$Ar^1$—X—$Ar^2$— is a residue which is generally derived from a bisphenol. Therefore, X represents a single bond, —O—, —CO—, —S—, —$SO_2$— or an alkylene having 1 to 3 carbon atoms, preferably a single bond, —O— or isopropylidene.

Further, the compound of the above (c-5) is 6H-benzo[c.e][1,2]oxaphosphorine-6-one. Two benzene rings in the compound (c-5) each may have 1 to 4 substituents, preferably 1 to 2 substituents. Illustrative examples of such substituents include the substituents (i) to (iv) exemplified as substituents for the aryl groups represented by $R^1$ to $R^4$ in the above formulae (c-2) to (c-4).

When the phosphorus and phosphorus compounds (component c) of the above (c-1) to (c-5) are contained in the resin composition of the present invention, its proportion is suitably 1 to 100 parts by weight, preferably 5 to 80 parts by weight, particularly preferably 1 to 60 parts by weight, based on 100 parts by weight of the phosphorus-containing compound (component b). Of the phosphorus and phosphorus compounds of the above (c-1) to (c-5), the phosphorus compounds of the (c-2) to (c-5) are preferred.

The resin composition of the present invention may further contain dicumyl (component d) represented by the following chemical formula.

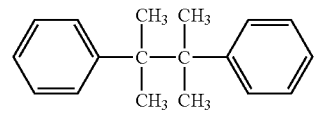

The dicumyl (component d) is contained in an amount of 0.01 to 3 parts by weight, preferably 0.02 to 2 parts by weight, particularly preferably 0.03 to 1 part by weight, based on 100 parts by weight of the resin component (component a). When the dicumyl is contained in the above proportion, a flame retarding effect is assumed to be ascribable to occurrence of radicals, thereby improving a level of flame retardancy.

The resin composition of the present invention may further contain a known flame retardant assistant. Such a flame retardant assistant is, for example, a silicone oil. The silicone oil is a polydiorganosiloxane, preferably polydiphenylsiloxane, polymethylphenylsiloxane, polydimethylsiloxane or a copolymer or mixture thereof. Of these, polydimethylsiloxane is preferably used. Its viscosity is preferably 0.8 to 5,000 centipoises (25° C.), more preferably 10 to 1,000 centipoises (25° C.), much more preferably 50 to 500 centipoises (25° C.). A silicone oil having viscosity within the above range is preferred because of its excellent flame retardancy. The amount of the silicone oil is preferably 0.5 to 10 parts by weight based on 100 parts by weight of the resin component (component a).

Further, a fluorocarbon resin may be added as the flame retardant assistant. Illustrative examples of the fluorocarbon resin include homopolymers and copolymers of fluorine-containing monomers such as tetrafluoroethylene, trifluoroethylene, vinyl fluoride, vinylidene fluoride and hexafluoropropylene. Further, the above fluorine-containing monomers may be copolymerized with polymerizable monomers such as ethylene, propylene and acrylate to the extent that a dripping preventing capacity is not impaired. Of these fluorocarbon resins, a polytetrafluoroethylene is preferred. The preferred polytetrafluoroethylene is one called "Type 3" according to ASTM Standards. The amount of the fluorocarbon resin is suitably 0.01 to 3 parts by weight, preferably 0.1 to 2 parts by weight, based on 100 parts by weight of the resin component (component a).

In addition, to the resin composition of the present invention, a variety of additives such as a degradation preventing agent, e.g., an antioxidant, ultraviolet absorber or light stabilizer; a lubricant; an antistatic agent; a mold releasing agent; a plasticizer; reinforced fiber, e.g., glass fiber and carbon fiber; a filler, e.g., talc, mica and wollastonite; and a coloring agent, e.g., a pigment may also be added. The additives are used in a proper amount which can be selected from a range which does not impair heat resistance, impact resistance and mechanical strength according to purposes and functions of the additives.

In preparing the resin composition of the present invention, the resin component (component a) and the phosphorus-containing compound (component b) and other components as required are pre-mixed by use of a blender such as a V-shaped blender, a supermixer, a superfloater or a Henschel mixer, and the pre-mixture is fed into a kneading machine and melt-mixed. As the kneading machine, a variety of melt blenders such as a kneader and a single or twin screw extruder can be used. In particular, a method comprising melting the resin composition by use of a twin screw extruder or the like at a temperature of 150 to 280° C., preferably 170 to 250° C., feeding a liquid component by use of a side feeder, extruding the mixture, and pelletizing the extrudate by a pelletizer is preferably used.

The flame retardant resin composition of the present invention has good heat resistance, in particular. Therefore, it is useful as a material for molding a variety of articles such as components of office automation equipment, home electric appliances and automobiles. Such molded articles can be produced by a conventional method such as a method in which the resin composition in pellet form is injection-molded by an injection molding machine at a cylinder temperature, for example, 160 to 250° C.

An article molded from the resin composition of the present invention has extremely superior physical properties as compared with a molded article containing a flame retardant as a conventionally known phosphorus-containing compound. In particular, the article molded from the resin composition of the present invention is characterized by excellent heat resistance, particularly a high heat distortion temperature under load (HDT). That is to say, it is known that a heat distortion temperature under load (HDT) which a high impact polystyrene resin inherently has significantly lowers when a phosphate known as a flame retardant for the resin such as triphenyl phosphate (TPP) or bis(nonylphenyl) phenyl phosphate (BNPP) is added to the resin. For example, when triphenyl phosphate is added to the polystyrene resin in an amount sufficient to achieve a flame retarding effect, retention of the heat distortion temperature under load (HDT) decreases to about 60 to 80%.

However, when the phosphorus-containing compound (component b) in the present invention is added to the polystyrene resin, the retention of the heat distortion temperature under load (HDT) is kept at at least 85%, indicating that its percentage of decrease is extremely small. Under suitable conditions, the article molded from the resin composition of the present invention has a high heat distortion temperature under load (HDT) retention of not lower than 90%. Surprisingly, the article may even show a retention of heat distortion temperature under load of 95% or higher or, in some cases, 100 to 105%. Thus, there has heretofore not been known the composition in which the heat distortion temperature under load (HDT) of the polystyrene resin itself hardly drops when the phosphorus-containing compound is added to the polystyrene resin as a flame retardant and which shows a heat distortion temperature under load which is the same as or higher than that of the resin.

In the resin composition of the present invention, retention of the heat distortion temperature under load of the high impact polystyrene resin to be used is at least 85%, preferably not lower than 90%, particularly preferably not lower than 95%. This indicates that the resin composition of the present invention has a large value from a practical standpoint within the above retention range and retains high heat resistance inherent in the high impact polystyrene resin. The retention of heat distortion temperature under load is determined by substituting a heat distortion temperature under load x (° C.) of the high impact polystyrene resin (component a) and a heat distortion temperature under load y (° C.) of the resin composition comprising the high impact polystyrene resin (component a) and the phosphorus-containing compound (component b) into an expression (y/x)×100%. Further, when the component a is substantially a high impact polystyrene resin (HIPS), the resin composition of the present invention shows a heat distortion temperature under load of preferably 65 to 100° C., more preferably 70 to 95° C., when measured by a method adhered to ASTM-D648 by use of a ¼-inch test piece under a load of 1.81 MPa (18.5 Kgf/cm$^2$).

Further, the article molded from the resin composition of the present invention has a small reduction in impact strength and impact strength sufficient to make the article practical.

The following two types of the resin compositions of the present invention has high heat resistance, particularly high retention of heat distortion temperature under load, and excellent practicality.

Type 1

A flame retardant resin composition comprising:
(A) 100 parts by weight of a resin component (component a) which substantially comprises a high impact polystyrene, and
(B) 1 to 50 parts by weight of a phosphorus-containing compound (component b) represented by the following general formula (I):

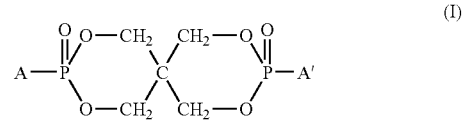

wherein A and A' are the same or different and represent —OR or -Q wherein R and Q represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

In the composition of the type 1, the resin component desirably contains the high impact polystyrene resin in an amount of not lower than 90% by weight. Further, an article molded from the resin composition of the type 1 has retention of a heat distortion temperature under load of not lower than 85%.

Type 2

A flame retardant resin composition comprising:
(A) 100 parts by weight of a resin component comprising 50 to 95% by weight of a high impact polystyrene resin and 5 to 50% by weight of a polyphenylene ether, and
(B) 1 to 50 parts by weight of a phosphorus-containing compound (component b-1) represented by the following general formula (I-1):

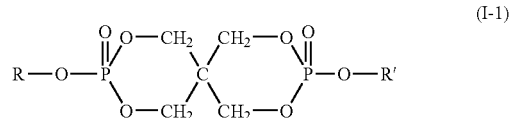

wherein R and R' are the same or different and represent an alkyl group having 1 to 12 carbon atoms, a cycloalkyl group having 5 to 10 carbon atoms, an aralkyl group having 7 to 20 carbon atoms or an aryl group having 6 to 15 carbon atoms.

An article molded from the resin composition of the type 2 has retention of a heat distortion temperature under load of not lower than 85° C.

Next, preparation examples of phosphorous-containing compounds used in Examples will be described.

PREPARATION EXAMPLE 1

Preparation of 2,4,8,10-tetraoxa-3,9-diphosphaspyro [5,5]undecane,3,9-diphenoxy-3,9-dioxide (b-1)

6.81 Parts of pentaerythritol, 16.0 parts of pyridine and 80.0 parts of dioxane were charged into a reactor equipped with a thermometer, a condenser and a dropping funnel and stirred. Then, 21.1 parts of phenyldichlorophosphate was added to the reactor by use of the dropping funnel. After completion of the addition, the mixture was refluxed under heating. After reacted, the mixture was cooled to room temperature, and obtained crystals were washed with water and methanol and then filtered. The crystals filtered out were dried at 120° C. and 133 Pa for 3 hours to obtain 19.6 parts of a white solid. It was confirmed by $^{31}$P, a $^1$HNMR spectrum and measurement of a melting point that the obtained solid was a target 2,4,8,10-tetraoxa-3,9-diphosphaspyro[5,5]undecane,3,9-diphenoxy-3,9-dioxide (hereinafter referred to as "b-1"). The yield was 80%, and $^{31}$PNMR purity was 99%.

$^1$H-NMR (DMSO-d$_6$, 300 MHz): δ7.38 (m, 10H), 4.75 and 4.45 (m, 8H), $^{31}$P-NMR (DMSO-d$_6$, 120 MHz): δ−13.52 (S), Melting Point: 193 to 195° C.

PREPARATION EXAMPLE 2

Preparation of 2,4,8,10-tetraoxa-3,9-diphosphaspyro [5,5]undecane,3,9-dimethoxy-3,9-dioxide (b-2)

6.81 Parts of pentaerythritol and 0.11 parts of DMF were charged into a reactor equipped with a thermometer, a condenser and a dropping funnel. Then, 30.68 parts of phosphorus oxychloride was added to the reactor by use of the dropping funnel. After completion of the addition, the mixture was heated at 50° C. After reacted, the mixture was cooled to room temperature, 39.7 parts of methylene chloride was added to the mixture, and obtained crystals were filtered out. The obtained crystals were washed with methylene chloride and dried at 120° C. and 133 Pa for 3 hours to obtain 11.14 parts of a white solid. 60.12 Parts of methanol was added to the obtained solid, and the resulting mixture was refluxed under heating for 1 hour. After completion of the reaction, hexane was added to the mixture, and obtained crystals were filtered out. The obtained solids were recrystallized from ethanol and dried at 120° C. and 133 Pa for 3 hours to obtain 6.51 parts of a white solid. It was confirmed by $^{31}$P, a $^1$HNMR spectrum and measurement of a melting point that the obtained solid was a target 2,4,8, 10-tetraoxa-3,9-diphosphaspyro[5,5]undecane,3,9-dimethoxy-3,9-dioxide (hereinafter referred to as "b-2"). The yield was 60%, and $^{31}$PNMR purity was 90%.

$^1$H-NMR (DMSO-d$_6$, 300 MHz): δ4.46 and 4.21 (m, 8H), 3.74 (d, 6H), $^{31}$P-NMR (DMSO-d$_6$, 120 MHz): δ−6.34 (S), Melting Point: 190 to 195° C.

PREPARATION EXAMPLE 3

Preparation of 2,4,8,10-tetraoxa-3,9-diphosphaspyro [5,5]undecane,3,9-diphenyl-3,9-dioxide (b-3)

6.81 Parts of pentaerythritol, 0.4 parts of pyridine and 80.0 parts of dioxane were charged into a reactor equipped with a thermometer, a condenser and a dropping funnel and stirred. Then, 19.5 parts of phenyldichlorophosphonic acid was added to the reactor by use of the dropping funnel. After completion of the addition, the mixture was refluxed under heating. After reacted, the mixture was cooled to room temperature, and obtained crystals were washed with water and methanol and then filtered. The crystals filtered out were dried at 120° C. and 133 Pa for 3 hours to obtain 18.8 parts of a white solid. It was confirmed by $^{31}$P, a $^1$HNMR spectrum and measurement of a melting point that the obtained solid was a target 2,4,8,10-tetraoxa-3,9-diphosphaspyro[5,5]undecane,3,9-diphenyl-3,9-dioxide (hereinafter referred to as "b-3"). The yield was 60%, and $^{31}$PNMR purity was 99%.

$^1$H-NMR (CDCl$_3$, 300 MHz): δ7.9 to 7.5 (m, 10H), 4.8 to 4.1 (m, 8H), $^{31}$P-NMR (CDCl$_3$, 120 MHz): δ18.43 (S), Melting Point: 265 to 268° C.

PREPARATION EXAMPLE 4

Preparation of 2,4,8,10-tetraoxa-3,9-diphosphaspyro [5,5]undecane,3,9-dimethyl-3,9-dioxide (b-4)

3.8 Parts of a white solid was obtained in the same manner as in Preparation Example 3 except that methyldichlorophosphonic acid was used in place of phenyldichlorophosphonic acid. It was confirmed by $^{31}$P, a $^1$HNMR spectrum and measurement of a melting point that the obtained solid was a target 2,4,8,10-tetraoxa-3,9-diphosphaspyro[5,5]undecane,3,9-dimethyl-3,9-dioxide (hereinafter referred to as "b-4"). The yield was 30%, and $^{31}$PNMR purity was 99%.

$^1$H-NMR (DMSO-d$_6$, 300 MHz): δ4.5 to 4.2 (m, 8H), 1.62 (d, 6H), $^{31}$P-NMR (DMSO-d$_6$, 120 MHz): δ27.52 (S), Melting Point: 248 to 251° C.

PREPARATION EXAMPLE 5

Preparation of 2,4,8,10-tetraoxa-3,9-diphosphaspyro [5,5]undecane,3,9-di-n-butyl-3,9-dioxide (b-5)

13.6 Parts of a white solid was obtained in the same manner as in Preparation Example 3 except that n-butyldichlorophosphonic acid was used in place of phenyldichlorophosphonic acid. It was confirmed by $^{31}$P, a $^1$HNMR spectrum and measurement of a melting point that the obtained solid was a target 2,4,8,10-tetraoxa-3,9-diphosphaspyro[5,5]undecane,3,9-di-n-butyl-3,9-dioxide (hereinafter referred to as "b-5"). The yield was 80%, and $^{31}$PNMR purity was 99%.

$^1$H-NMR (CDCl$_3$, 300 MHz): δ4.6 to 3.8 (m, 8H), 2.0 to 1.8 (m, 4H), 1.8 to 1.55 (m, 4H), 1.5 to 1.35 (m, 4H), 0.95 (t, 6H), $^{31}$P-NMR (CDCl$_3$, 120 MHz): δ33.6 (S), Melting Point: 196 to 198° C.

PREPARATION EXAMPLE 6

Preparation of 2,4,8,10-tetraoxa-3,9-diphosphaspyro [5,5]undecane,3,9-di-t-butyl-3,9-dioxide (b-6)

5.9 Parts of a white solid was obtained in the same manner as in Preparation Example 3 except that t-butyldichlorophosphonic acid was used in place of phenyldichlorophosphonic acid. It was confirmed by $^{31}$P, a $^1$HNMR spectrum and measurement of a melting point that the obtained solid was a target 2,4,8,10-tetraoxa-3,9-diphosphaspyro[5,5]undecane,3,9-di-t-butyl-3,9-dioxide (hereinafter referred to as "b-6"). The yield was 35%, and $^{31}$PNMR purity was 99%.

$^{1}$H-NMR (CDCl$_3$, 300 MHz): δ4.65 to 3.7 (m, 8H), 1.27 (d, 9H), $^{31}$P-NMR (CDCl$_3$, 120 MHz): δ38.6 (S), Melting Point: 312 to 313° C.

PREPARATION EXAMPLE 7

Preparation of 2,4,8,10-tetraoxa-3,9-diphosphaspyro [5,5]undecane,3,9-dibenzyl-3,9-dioxide (b-7)

15.3 Parts of a white solid was obtained in the same manner as in Preparation Example 3 except that benzyldichlorophosphonic acid was used in place of phenyldichlorophosphonic acid. It was confirmed by $^{31}$P, a $^{1}$HNMR spectrum and measurement of a melting point that the obtained solid was a target 2,4,8,10-tetraoxa-3,9-diphosphaspyro[5,5]undecane,3,9-dibenzyl-3,9-dioxide (hereinafter referred to as "b-7"). The yield was 75%, and $^{31}$PNMR purity was 99%.

$^{1}$H-NMR (CDCl$_3$, 300 MHz): δ7.4 to 7.2 (m, 10H), 4.4 to 4.1 (m, 8H), 3.48 (d, 4H), $^{31}$P-NMR (CDCl$_3$, 120 MHz): δ23.1 (S), Melting Point: 257 to 259° C.

PREPARATION EXAMPLE 8

Preparation of 2,4,8,10-tetraoxa-3,9-diphosphaspyro [5,5]undecane,3-phenoxy-9-methyl-3,9-dioxide (b-8)

6.81 Parts of pentaerythritol, 0.4 parts of pyridine and 70.0 parts of dioxane were charged into a reactor equipped with a thermometer, a condenser and a dropping funnel and stirred. Then, 11.8 parts of phenyldichlorophosphate was added to the reactor by use of the dropping funnel. After completion of the addition, the mixture was refluxed under heating. After the reaction, dioxane was distilled out, and acetone and water were added to the resulting mixture. A produced white solid was filtered out, and a mother liquor was vacuum-concentrated under heating. A concentrated mother liquor obtained by repeating the procedure three times was added to ice water, thereby obtaining a white solid. The obtained solid was dried at 120° C. and 133 Pa for 3 hours to obtain 6.03 parts of a white solid. Then, 6.03 parts of the obtained white solid, 3.5 parts of pyridine, 90.0 parts of dioxane and 2.9 parts of methylphosphonic acid dichloride were charged into a reactor equipped with a thermometer, a condenser and a dropping funnel and stirred. Then, the mixture was refluxed under heating. After the reaction, dioxane was distilled out, the resulting mixture was dissolved in methanol, and pyridine hydrochloride was removed by column chromatography. After the obtained solution was vacuum-concentrated under heating to be dried and solidified, it was washed with water. A material filtered out was dried at 120° C. and 133 Pa for 3 hours to obtain 5.2 parts of a white solid. It was confirmed by $^{31}$P, a $^{1}$HNMR spectrum and measurement of a melting point that the obtained solid was a target 2,4,8,10-tetraoxa-3,9-diphosphaspyro[5,5]undecane,3,9-diphenoxy-3,9-dioxide (hereinafter referred to as "b-8"). The yield was 40%, and $^{31}$PNMR purity was 99%.

$^{1}$H-NMR (CDCl$_3$, 300 MHz): δ7.4 to 7.2 (m, 5H), 4.75 to 3.8 (m, 8H), 1.64 (d, 3H), $^{31}$P-NMR (CDCl$_3$, 120MHz): δ 31.57 (S), −13.68 (S), Melting Point: 195 to 196° C.

EXAMPLES

The present invention will be described in detail with reference to examples hereinafter. However, a scope of the present invention shall not be limited to these examples. Evaluations were made in accordance with the following methods.

(1) Flame Retardancy (Evaluated in Accordance with UL-94)

Flame retardancy was evaluated by use of a test piece having a size of 3.18 mm (⅛ inch) in accordance with a vertical firing test defined in U.S. UL Standard UL-94 as a scale for evaluating flame retardancy. A test piece which stopped burning without dripping within 30 seconds after removal of a flame was evaluated as "V-1", one which stopped burning by dripping within 30 seconds after removal of a flame was evaluated as "V-2", and a test piece which did not meet these criteria are evaluated as "not V".

(2) Reduced Viscosity $\eta_{SP}/C$

A mixed solvent of 18 ml of methyl ethyl ketone and 2 ml of methanol was added to 1 g of a rubber-modified styrene resin. The mixture was shaken at 25° C. for 2 hours and then centrifuged at 5° C. and 4,000 rpm for 30 minutes. A supernatant was taken out, and a resin component was deposited by methanol and then dried. Then, 0.1 g of the thus obtained resin was dissolved in toluene to prepare a 0.5 g/dl solution. 10 ml of this solution was put into an Ostwald viscometer having a capillary diameter of 0.3 mm, and a time of flow in seconds $t_1$ of the solution was measured at 30° C. Meanwhile, a time of flow in seconds $t_0$ of toluene was measured by the same viscometer, and a reduced viscosity was calculated from the following expression. In this case, the time of flow in seconds $t_0$ of toluene is preferably not less than 240 seconds. $\eta_{SP}/C=(t_1/t_0-1)/C$ (C: polymer concentration g/dl)

(3) Amount of Rubber-Like Polymer Component in Rubber-Modified Styrene Resin

Nuclear magnetic resonance of a hydrogen atom was measured by means of a nuclear magnetic resonance measuring device (UNITY300 manufactured by BARIAN CO., LTD.), and the amount of a rubber-like polymer component was calculated from the molar ratio of a styrene unit to a butadiene unit.

(4) Heat Distortion Temperature Under Load (HDT) and Retention of Heat Distortion Temperature Under Load A heat distortion temperature under load was measured by use of a test piece having a size of 6.35 mm (¼ inch) under a load of 18.5 kg in accordance with a method adhered to ASTM-D648. As for retention of a heat distortion temperature under load, a heat distortion temperature under load x (° C.) of a rubber-modified styrene resin used and a heat distortion temperature under load y (° C.) of a styrene resin composition were measured, and the retention of a heat distortion temperature under load was calculated from an expression (y/x)×100(%).

(5) MFR Value

An MFR value was measured at 230° C. and 37.3 N (load of 3.8 kg) in accordance with measurement defined in JIS-K7210.

The following components were used in Examples and Comparative Examples.

(A) Resin Components (1) Rubber-modified styrene resin (hereinafter referred to as "H-1") having a reduced viscosity $\eta_{SP}/C$ of 0.63 dl/g, 4.3% by weight of a rubber-like polymer component and an MFR of 36.0 g/10 min.

(2) Rubber-modified styrene resin (hereinafter referred to as "H-2") having a reduced viscosity $\eta_{SP}/C$ of 0.78 dl/g, 4.3% by weight of a rubber-like polymer component and an MFR of 71.9 g/10 min.

(3) Rubber-modified styrene resin (hereinafter referred to as "H-3") having a reduced viscosity $\eta_{SP}/C$ of 0.96 dl/g, 7.9% by weight of a rubber-like polymer component and an MFR of 7.9 g/10 min.

(4) Modified polyphenylene ether ({NORYL manufactured by GE Plastic Japan (hereinafter referred to as "H-4")}

(B) Cyclic Organic Phosphorus Compounds (1)

2,4,8,10-tetraoxa-3,9-diphosphaspyro[5,5]undecane,3,9-diphenoxy-3,9-dioxide {cyclic phosphate compound (hereinafter referred to as "b-1") of the above general formula (I-1) wherein both R and R' are a phenyl group.}

(2)

2,4,8,10-tetraoxa-3,9-diphosphaspyro[5,5]undecane,3,9-dimethoxy-3,9-dioxide {cyclic phosphate compound (hereinafter referred to as "b-2") of the above general formula (I-1) wherein both R and R' are a methyl group.}

(3)

2,4,8,10-tetraoxa-3,9-diphosphaspyro[5,5]undecane,3,9-diphenyl-3,9-dioxide {cyclic phosphonate compound (hereinafter referred to as "b-3") of the above general formula (I-2) wherein both Q and Q' are a phenyl group.}

(4)

2,4,8,10-tetraoxa-3,9-diphosphaspyro[5,5]undecane,3,9-dimethyl-3,9-dioxide {cyclic phosphonate compound (hereinafter referred to as "b-4") of the above general formula (I-2) wherein both Q and Q' are a methyl group.}

(5)

2,4,8,10-tetraoxa-3,9-diphosphaspyro[5,5]undecane,3,9-di-n-butyl-3,9-dioxide {cyclic phosphonate compound (hereinafter referred to as "b-5") of the above general formula (I-2) wherein both Q and Q' are an n-butyl group.}

(6)

2,4,8,10-tetraoxa-3,9-diphosphaspyro[5,5]undecane,3,9-di-t-butyl-3,9-dioxide {cyclic phosphonate compound (hereinafter referred to as "b-6") of the above general formula I-2) wherein both Q and Q' are a t-butyl group.}

(7)

2,4,8,10-tetraoxa-3,9-diphosphaspyro[5,5]undecane,3,9-dibenzyl-3,9-dioxide {cyclic phosphonate compound (hereinafter referred to as "b-7") of the above general formula (I-2) wherein both Q and Q' are a benzyl group.}

(8) 2,4,8,10-tetraoxa-3,9-diphosphaspyro[5,5]undecane,3-phenoxy-9-methyl-3,9-dioxide {cyclic organic phosphorus compound (hereinafter referred to as "b-8") of the above general formula (I-3) wherein R is a phenyl group and Q is a methyl group.}

(C) Other Phosphorus Compounds (1) Red Phosphorus {NOVAEXCEL 140 (hereinafter referred to as "c-1") manufactured by RINKAGAKU KOUGYO CO., LTD.}

(2) Triphenyl Phosphate {TPP (hereinafter referred to as "c-2") manufactured by DAIHACHI CHEMICAL INDUSTRY CO., LTD.}

(3) 1,3-phenylenebis[di(diphenyl)phosphate] {organic phosphate compound of the above general formula (C-3-1) wherein $R^4$, $R^5$, $R^6$ and $R^7$ are a phenyl group, CR-733S (hereinafter referred to as "c-3-1") manufactured by DAIHACHI CHEMICAL INDUSTRY CO., LTD.}

(4) 1,3-phenylenebis[di(2,6-dimethylphenyl)phosphate] {organic phosphate compound of the above general formula (4) wherein $R^4$, $R^5$, $R^6$ and $R^7$ are a 2,6-dimethylphenyl group, ADEKASTAB FP-500 (hereinafter referred to as "c-3-2") manufactured by ASAHI DENKA KOGYO K.K.}

(5) Bisphenol-A[di(diphenyl)phosphate] {organic phosphate compound of the above general formula (c-4) wherein $R^4$, $R^5$, $R^6$ and $R^7$ are a phenyl group, $Ar^1$ and $Ar^2$ are a phenylene group and X is an isopropylidene group, CR-741 (hereinafter referred to as "c-4") manufactured by DAIHACHI CHEMICAL INDUSTRY CO., LTD.}

(6) 6H-dibenzo[c,e][1,2]oxaphosphorine-6-one {HCA (hereinafter referred to as "c-5") manufactured by SANKO CO., LTD.}

(D) Other Additives

Dicumyl {NOFMAR BC-90 (hereinafter referred to as "d-1") manufactured by NOF CORPORATION}

Examples 1 to 25 and
Comparative Examples 1 to 15

Components shown in Table 1 were mixed together in a tumbler in amounts (parts by weight) shown in Table 1. The mixtures were pelletized at a resin temperature of 180° C. by use of a 15-mm-φ twin screw extruder (KZW15 manufactured by TECHNOBEL CO., LTD.), and obtained pellets were dried by use of a hot air dryer at 65° C. for 4 hours. The dried pellets were molded by use of an injection molding machine (J75Si manufactured by JSW) at a cylinder temperature of 200° C. Results of evaluations by use of molded plates are shown in Table 1.

TABLE 1

|  |  | Unit | Ex. 1 | Ex. 2 | Ex. 3 | Ex. 4 | Ex. 5 | Ex. 6 |
|---|---|---|---|---|---|---|---|---|
| Resin | H-1 | Parts by weight | 100 | 100 |  |  | 100 |  |
| Component | H-2 | Parts by weight |  |  | 100 | 100 |  | 100 |
|  | H-3 | Parts by weight |  |  |  |  |  |  |
| Flame | B | Kind | b-1 | b-1 | b-1 | b-1 | b-2 | b-2 |
| Retardant |  | Parts by weight | 5 | 10 | 5 | 10 | 5 | 5 |
| HDT | ¼" | ° C. | 73.4 | 69.7 | 73.0 | 70.3 | 71.0 | 70.5 |

TABLE 1-continued

| | | | | | | | | |
|---|---|---|---|---|---|---|---|---|
| Retention of HDT | | % | 102.5 | 97.3 | 103.3 | 99.4 | 99.2 | 99.7 |
| Flame Retardancy | | Evaluation | V-2 | V-2 | V-2 | V-2 | V-2 | V-2 |

| | | Unit | Ex. 7 | Ex. 8 | Ex. 9 | Ex. 10 | Ex. 11 | Ex. 12 |
|---|---|---|---|---|---|---|---|---|
| Resin | H-1 | Parts by weight | 100 | | | | | |
| Component | H-2 | Parts by weight | | 100 | | | | |
| | H-3 | Parts by weight | | | 100 | 100 | 100 | 100 |
| Flame | B | Kind | b-3 | b-3 | b-4 | b-5 | b-6 | b-7 |
| Retardant | | Parts by weight | 5 | 5 | 15 | 15 | 15 | 15 |
| HDT | ¼" | °C. | 71.5 | 71.3 | 79.9 | 75.0 | 82.3 | 80.6 |
| Retention of HDT | | % | 99.6 | 100.8 | 100.6 | 94.5 | 103.7 | 101.5 |
| Flame Retardancy | | Evaluation | V-2 | V-2 | V-2 | V-2 | V-2 | V-2 |

| | | Unit | Ex. 13 | Ex. 14 | Ex. 15 | Ex. 16 | Ex. 17 | Ex. 18 | Ex. 19 |
|---|---|---|---|---|---|---|---|---|---|
| Resin | H-1 | Parts by weight | | | | | | | |
| Com- | H-2 | Parts by weight | | | | | | | |
| ponent | H-3 | Parts by weight | 100 | 100 | 100 | 100 | 100 | 100 | 100 |
| | H-4 | Parts by weight | | | | | | | |
| Flame | B | Kind | b-8 | b-1 | b-1 | b-1 | b-1 | b-1 | b-1 |
| Retardant | | Parts by weight | 15 | 10 | 10 | 10 | 10 | 10 | 10 |
| | C | Kind | | c-1 | c-2 | c-3-1 | c-3-2 | c-4 | c-5 |
| | | Parts by weight | | 5 | 5 | 5 | 5 | 5 | 5 |
| Additive | D | Kind | | | | | | | |
| | | Parts by weight | | | | | | | |
| HDT | ¼" | °C. | 77.6 | 80.4 | 68.8 | 70.2 | 71.5 | 71.4 | 69.5 |
| Retention of HDT | | % | 97.7 | 101.3 | 86.6 | 88.4 | 90.1 | 89.9 | 87.5 |
| Flame Retardancy | | Evaluation | V-2 | V-2 | V-2 | V-2 | V-2 | V-2 | V-2 |

| | | Unit | Ex. 20 | Ex. 21 | Ex. 22 | Ex. 23 | Ex. 24 | Ex. 25 |
|---|---|---|---|---|---|---|---|---|
| Resin | H-1 | Parts by weight | | | | | | |
| Com- | H-2 | Parts by weight | 100 | | | | | |
| ponent | H-3 | Parts by weight | | 100 | 100 | 70 | 60 | 90 |
| | H-4 | Parts by weight | | | | 30 | 40 | 10 |
| Flame | B | Kind | b-1 | b-6 | b-7 | b-1 | b-1 | b-1 |
| Retardant | | Parts by weight | 5 | 15 | 15 | 15 | 15 | 15 |
| | C | Kind | | | | | | |
| | | Parts by weight | | | | | | |
| Additive | D | Kind | d-1 | d-1 | d-1 | | | |
| | | Parts by weight | 0.5 | 0.5 | 0.5 | | | |
| HDT | ¼" | °C. | 70.1 | 81.6 | 80.3 | 91.5 | 101.5 | 83.0 |
| Retention of HDT | | % | 99.2 | 102.8 | 101.1 | 89.1 | 93.1 | 89.2 |
| Flame Retardancy | | Evaluation | V-2 | V-2 | V-2 | V-2 | V-1 | V-2 |

| | | Unit | C. Ex. 1 | C. Ex. 2 | C. Ex. 3 | C. Ex. 4 | C. Ex. 5 |
|---|---|---|---|---|---|---|---|
| Resin | H-1 | Parts by weight | 100 | | | | |
| Component | H-2 | Parts by weight | | 100 | | | |
| | H-3 | Parts by weight | | | 100 | 70 | 60 |
| | H-4 | Parts by weight | | | | 30 | 40 |
| Flame | C | Kind | | | | | |
| Retardant | | Parts by weight | | | | | |
| HDT | ¼" | °C. | 71.6 | 70.7 | 79.4 | 102.7 | 109.0 |
| Retention of HDT | | % | — | — | — | — | — |
| Flame Retardancy | | Evaluation | not V | not V | not V | not V | not V |

| | | Unit | C. Ex. 6 | C. Ex. 7 | C. Ex. 8 | C. Ex. 9 | C. Ex. 10 |
|---|---|---|---|---|---|---|---|
| Resin | H-1 | Parts by weight | | 100 | | | |
| Component | H-2 | Parts by weight | | | 100 | | |
| | H-3 | Parts by weight | 90 | | | 100 | 100 |
| | H-4 | Parts by weight | 10 | | | | |
| Flame | C | Kind | | c-2 | c-2 | c-3-1 | c-4 |
| Retardant | | Parts by weight | | 5 | 5 | 5 | 5 |
| HDT | ¼" | °C. | 93.0 | 64.4 | 55.3 | 64.6 | 65.2 |
| Retention of HDT | | % | — | 89.9 | 78.2 | 91.4 | 92.2 |
| Flame Retardancy | | Evaluation | not V | V-2 | V-2 | not V | V-2 |

| | | Unit | C. Ex. 11 | C. Ex. 12 | C. Ex. 13 | C. Ex. 14 | C. Ex. 15 |
|---|---|---|---|---|---|---|---|
| Resin | H-1 | Parts by weight | | | | | |
| Component | H-2 | Parts by weight | | | | | |
| | H-3 | Parts by weight | 100 | 100 | 100 | 100 | 100 |
| | H-4 | Parts by weight | | | | | |
| Flame | C | Kind | c-2 | c-3-1 | c-3-2 | c-4 | c-5 |
| Retardant | | Parts by weight | 15 | 15 | 15 | 15 | 15 |
| HDT | ¼" | °C. | 54.1 | 64.1 | 65.9 | 64.8 | 60.7 |

TABLE 1-continued

| Retention of HDT | % | 68.1 | 80.7 | 82.9 | 81.6 | 76.4 |
| Flame Retardancy | Evaluation | V-2 | not V | not V | not V | V-2 |

Ex.: Example
C. Ex.: Comparative Example

Generally, a flame retarding effect of a phosphate-based flame retardant on a high impact polystyrene resin (HIPS) is derived from its plasticizing effect, and a quenching effect is not seen.

The size of a flame is about the same as that when no flame retardant is added. A burning portion of a test piece is molten and dripped at an early stage, whereby the test piece itself stops burning. However, the molten and fallen drip continues burning and cannot be extinguished easily.

Of the above examples, those which showed different behaviors from the above burning behavior in particular will be described with respect to the behaviors hereinafter.

(1) Examples 9, 10, 11 and 12

The size of a flame at the time of burning was small, and a quenching tendency was seen.

(2) Examples 21 and 22

The size of a flame at the time of burning was small, and a quenching tendency was seen. Further, time spent to quench a burning drip was very short (the drip did not continue burning).

(3) Example 20

A big difference was not seen as compared with Example 3, but a stable number of seconds for quenching was seen.

(4) Example 23

The size of a flame at the time of burning was extremely small. A char was produced, a flammable gas stopped flowing into a gas phase, and a process of quenching could be seen.

A burning portion of the test piece was not easily dripped at all, and formation of the char lowered flowability of the resin.

(5) Example 24

The size of a flame at the time of burning was extremely small. A char was produced, a flammable gas stopped flowing into a gas phase, and a process of quenching could be recognized. A burning portion of the test piece was not dripped.

The invention claimed is:

1. A flame retardant resin composition comprising:
   (A) 100 parts by weight of a resin component (component a) which comprises a high impact polystryrene, said polystyrene having a reduced viscosity $\eta_{sp}/C$, of 0.2 to 1.5 dl/g and being present in an amount not lower than 90% by weight of the resin component, and
   (B) 1 to 50 parts by weight of a phosphorus-containing compound (component b-2) represented by the following formula (I-2-a):

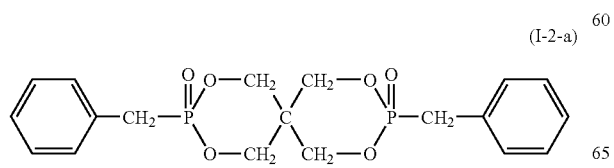

(I-2-a)

wherein the resin composition can achieve retention of a heat distortion temperature under load (M) represented by the following expression of at least 95%

$$M\ (\%) = (y/x) \times 100$$

wherein x represents a heat distortion temperature under load (° C.) of an article molded from the resin component (component a) and y represents a heat distortion temperature under load (° C.) of an article molded from a resin composition comprising the resin component (component a) and the phosphorus-containing compound (component b-2), said heat distortion temperature under load measured by a method according to ASTM-D648 by use of a ¼-inch test piece under a load of 1.81 MPa (18.5 Kgf/cm²), and
   the resin composition can achieve at least a flame retardancy level V-2 in a UL 94 Standard.

2. The resin composition of claim 1, which further contains at least one compound (component c) selected from the group consisting of the following compounds (c-1) to (c-5) in an amount of 1 to 100 parts by weight based on 100 parts by weight of the phosphorus-containing compound (component b-2) represented by the general formula (I-2-a),
   (c-1) red phosphorus
   (c-2) triaryl phosphate represented by the following formula (c-2)

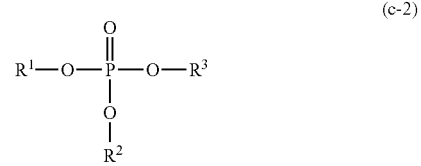

(c-2)

(c-3) condensed phosphate represented by the following formula (c-3)

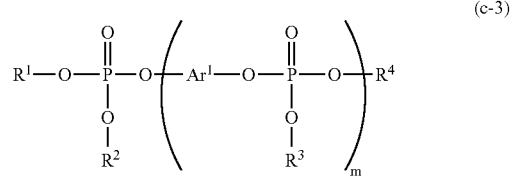

(c-3)

(c-4) condensed phosphate represented by the following formula (c-4)

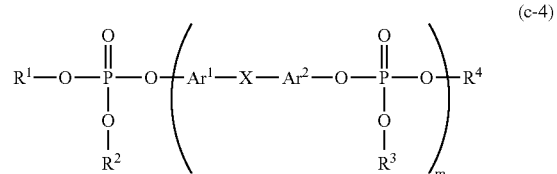

(c-4)

(c-5) compound represented by the following formula (c-5)

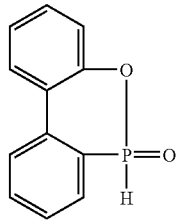

(c-5)

wherein in the formulae (c-2) to (c-4), $R^1$ to $R^4$ may be the same or different and represent an aryl group having 6 to 15 carbon atoms which may be substituted by one to five groups selected from an alkyl group having 1 to 12 carbon atoms, an alkoxy group having 1 to 12 carbon atoms, an alkylthio group having 1 to 12 carbon atoms and a group —Y—$Ar^3$ (wherein Y represents —O—, —S— or an alkylene group having 1 to 8 carbon atoms, and $Ar^3$ represents an aryl group having 6 to 15 carbon atoms), $Ar^1$ and $Ar^2$, if both are present, may be the same or different and represent an arylene group having 6 to 15 carbon atoms which may be substituted by one to four groups selected from an alkyl group having 1 to 4 carbon atoms, an aralkyl group having 7 to 20 carbon atoms and a group -Z-$R^5$ (wherein Z represents —O— or —S—, and $R^5$ represents an alkyl group having 1 to 4 carbon atoms or an aryl group having 6 to 15 carbon atoms), X represents a single bond, —O—, —CO—, —S—, —$SO_2$— or an alkylene group having 1 to 3 carbon atoms, and m represents an integer of 1 to 5; and two benzene rings in the formula (c-5) each may have one to four substituents selected from the same substituents as those for the aryl groups represented by $R^1$ to $R^4$.

3. The resin composition of claim 1, which further contains dicumyl in an amount of 0.01 to 3 parts by weight based on 100 parts by weight of the resin component (component a).

4. A flame retardant resin composition comprising:
(A) 100 parts by weight of a resin component (component a) which comprises a high impact polystryrene, said polystyrene having a reduced viscosity $\eta_{sp}/C$, of 0.2 to 1.5 dl/g and being present in an amount not lower than 90% by weight of the resin component, and
(B) 1 to 50 parts by weight of a phosphorus-containing compound (component b-2) represented by the following formula (I-2-a):

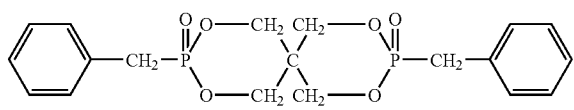

(I-2-a)

and
(c) 1 to 100 parts by weight based on 100 parts by weight of the phosphorus-containing compound (component b-2) of at least one compound (component c) selected from the group consisting of the following compounds (c-1) to (c-5):

(c-1) red phosphorus
(c-2) triaryl phosphate represented by the following formula (c-2)

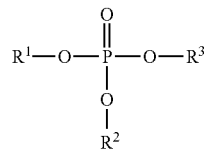

(c-2)

(c-3) condensed phosphate represented by the following formula (c-3)

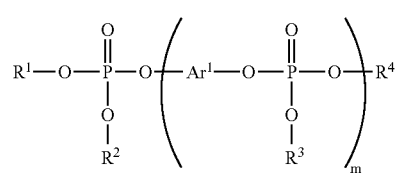

(c-3)

(c-4) condensed phosphate represented by the following formula (c-4)

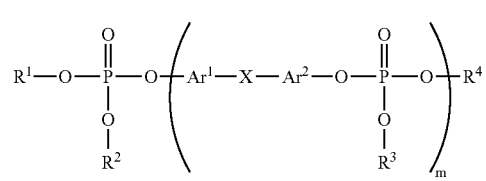

(c-4)

(c-5) compound represented by the following formula (c-5)

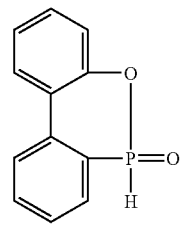

(c-5)

wherein in the formulae (c-2) to (c-4), $R^1$ to $R^4$ may be the same or different and represent an aryl group having 6 to 15 carbon atoms which may be substituted by one to five groups selected from an alkyl group having 1 to 12 carbon atoms, an alkoxy group having 1 to 12 carbon atoms, an alkylthio group having 1 to 12 carbon atoms and a group —Y—$Ar^3$ (wherein Y represents —O—, —S— or an alkylene group having 1 to 8 carbon atoms, and $Ar^3$ represents an aryl group having 6 to 15 carbon atoms), $Ar^1$ and $Ar^2$, if both are present, may be the same or different and represent an arylene group having 6 to 15 carbon atoms which may be substituted by one to four groups selected from an alkyl group having 1 to 4 carbon atoms, an aralkyl group having 7 to 20 carbon atoms and a group -Z-$R^5$ (wherein Z represents —O— or —S—, and $R^5$ represents an alkyl group having 1 to 4 carbon atoms or an aryl group having 6 to 15 carbon atoms), X represents a single bond, —O—, —CO—, —S—, —SO$_2$— or an alkylene group having 1 to 3 carbon atoms, and m represents an integer of 1 to 5; and two benzene rings in the formula (c-5) each may have one to four substituents selected from the same substituents as those for the aryl groups represented by $R^1$ to $R^4$.

5. A flame retardant resin composition comprising:

(A) 100 parts by weight of a resin component (component a) which comprises a high impact polystryrene, said polystyrene having a reduced viscosity $\eta_{sp}/C$, of 0.2 to 1.5 dl/g and being present in an amount not lower than 90% by weight of the resin component, and (B) 1 to 50 parts by weight of a phosphorus-containing compound (component b-2) represented by the following formula (I-2-a):

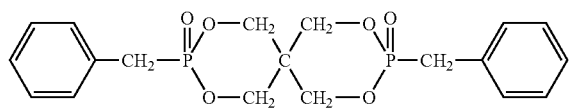
(I-2-a)

(c) 1 to 100 parts by weight based on 100 parts by weight of the phosphorus-containing compound (component b-2) of at least one compound (component c) selected from the group consisting of the following compounds (c-1) to (c-5):

(c-1) red phosphorus (c-2) triaryl phosphate represented by the following formula (c-2)

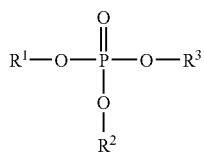
(c-2)

(c-3) condensed phosphate represented by the following formula (c-3)

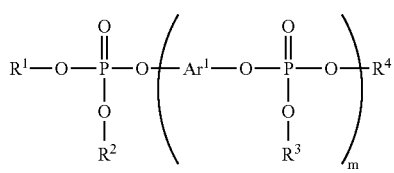
(c-3)

(c-4) condensed phosphate represented by the following formula (c-4)

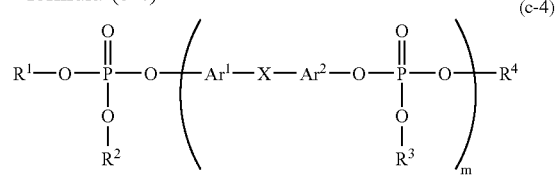
(c-4)

(c-5) compound represented by the following formula (c-5)

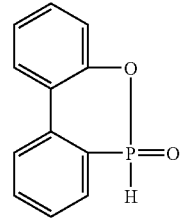
(c-5)

wherein in the formulae (c-2) to (c-4), $R^1$ to $R^4$ may be the same or different and represent an aryl group having 6 to 15 carbon atoms which may be substituted by one to five groups selected from an alkyl group having 1 to 12 carbon atoms, an alkoxy group having 1 to 12 carbon atoms, an alkylthio group having 1 to 12 carbon atoms and a group —Y—Ar$^3$ (wherein Y represents —O—, —S— or an alkylene group having 1 to 8 carbon atoms, and Ar$^3$ represents an aryl group having 6 to 15 carbon atoms), Ar$^1$ and Ar$^2$, if both are present, may be the same or different and represent an arylene group having 6 to 15 carbon atoms which may be substituted by one to four groups selected from an alkyl group having 1 to 4 carbon atoms, an aralkyl group having 7 to 20 carbon atoms and a group -Z-R$^5$ (wherein Z represents —O— or —S—, and $R^5$ represents an alkyl group having 1 to 4 carbon atoms or an aryl group having 6 to 15 carbon atoms), X represents a single bond, —O—, —CO—, —S—, —SO$_2$— or an alkylene group having 1 to 3 carbon atoms, and m represents an integer of 1 to 5; and two benzene rings in the formula (c-5) each may have one to four substituents selected from the same substituents as those for the aryl groups represented by $R^1$ to $R^4$, and (D) 0.01 to 3 parts by weight based on 100 parts by weight of the resin component (component a) of dicumyl (component d).

* * * * *